(12) United States Patent
Plunkett, Jr.

(10) Patent No.: US 11,546,673 B2
(45) Date of Patent: Jan. 3, 2023

(54) AUTOMATIC VIDEO AUGMENTATION

(71) Applicant: AT&T Intellectual Property I, L.P., Atlanta, GA (US)

(72) Inventor: David D. Plunkett, Jr., Kennesaw, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 113 days.

(21) Appl. No.: 17/086,237

(22) Filed: Oct. 30, 2020

(65) Prior Publication Data

US 2022/0141547 A1    May 5, 2022

(51) Int. Cl.
| | |
|---|---|
| H04N 21/81 | (2011.01) |
| G06K 9/00 | (2022.01) |
| H04N 21/44 | (2011.01) |
| H04N 21/43 | (2011.01) |
| H04N 21/439 | (2011.01) |
| H04N 21/8547 | (2011.01) |
| G06V 20/40 | (2022.01) |

(52) U.S. Cl.
CPC .......... *H04N 21/816* (2013.01); *G06V 20/46* (2022.01); *G06V 20/48* (2022.01); *H04N 21/4302* (2013.01); *H04N 21/4394* (2013.01); *H04N 21/44008* (2013.01); *H04N 21/8547* (2013.01); *G06V 20/44* (2022.01)

(58) Field of Classification Search
None
See application file for complete search history.

(56) References Cited

U.S. PATENT DOCUMENTS

| | | | |
|---|---|---|---|
| 2009/0094637 A1* | 4/2009 | Lemmons | H04N 7/17318 725/40 |
| 2012/0120296 A1* | 5/2012 | Roberts | H04N 21/4126 348/333.12 |
| 2017/0188084 A1* | 6/2017 | Barreira Avegliano | H04N 21/8126 |
| 2020/0135225 A1* | 4/2020 | Vaughn | H04N 21/25891 |
| 2021/0289255 A1* | 9/2021 | Balint | H04N 21/6547 |

* cited by examiner

*Primary Examiner* — Rong Le

(57) ABSTRACT

An example method includes identifying a video content being presented to a first user on a first device, identifying a first augmentation media stream that corresponds to the video content, detecting a first time point in the video content that is currently being presented, identifying a first time point in the first augmentation media stream that corresponds to the first time point in the video content, and delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively.

20 Claims, 3 Drawing Sheets

AUTOMATIC VIDEO AUGMENTATION

The present disclosure relates generally to the presentation of video, and relates more particularly to devices, non-transitory computer-readable media, and methods for automatically enhancing the presentation of video content.

BACKGROUND

Consumers (e.g., users of media content, hereinafter also referred to as simply "users") are being presented with an ever increasing number of services via which media content can be accessed and enjoyed. For instance, streaming video and audio services, video on demand services, social media, and the like are offering more forms of content (e.g., short-form, always-on, raw sensor feed, etc.) and a greater number of distribution channels (e.g., mobile channels, social media channels, streaming channels, just-in-time on-demand channels, etc.) than have ever been available in the past. As the number of choices available to users increases and diversifies, service providers seeking to retain their customer bases are looking for ways to increase the engagement of their customers with their content.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
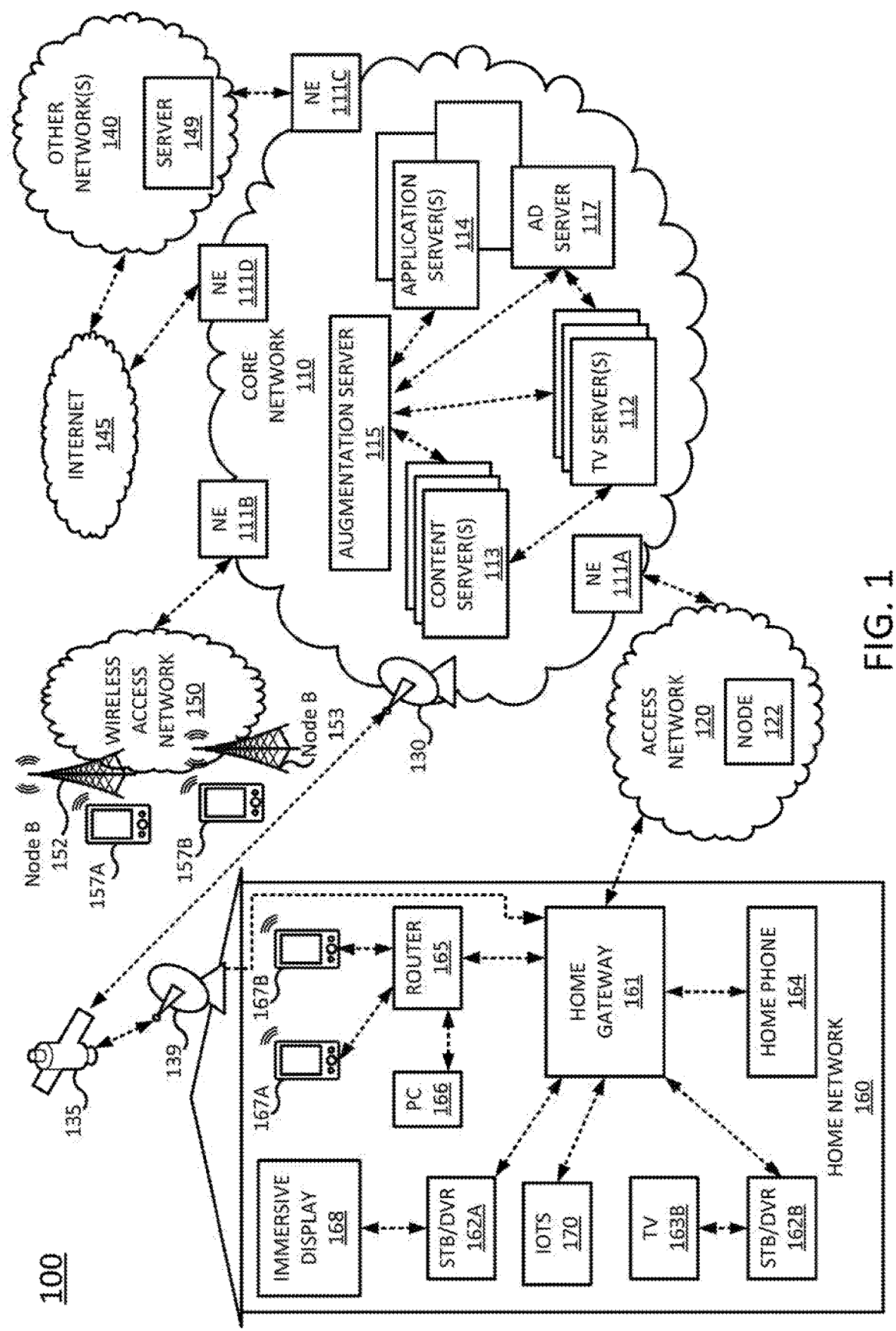
FIG. 1 illustrates an example system in which examples of the present disclosure for augmenting video content may operate.

The present disclosure broadly discloses methods, computer-readable media, and systems for automatically augmenting the presentation of video content. In one example, a method performed by a processing system includes identifying a video content being presented to a first user on a first device, identifying a first augmentation media stream that corresponds to the video content, detecting a first time point in the video content that is currently being presented, identifying a first time point in the first augmentation media stream that corresponds to the first time point in the video content, and delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively.

In another example, a non-transitory computer-readable medium may store instructions which, when executed by a processing system in a communications network, cause the processing system to perform operations. The operations may include identifying a video content being presented to a first user on a first device, identifying a first augmentation media stream that corresponds to the video content, detecting a first time point in the video content that is currently being presented, identifying a first time point in the first augmentation media stream that corresponds to the first time point in the video content, and delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively.

In another example, a device may include a processing system including at least one processor and non-transitory computer-readable medium storing instructions which, when executed by the processing system when deployed in a communications network, cause the processing system to perform operations. The operations may include identifying a video content being presented to a first user on a first device, identifying a first augmentation media stream that corresponds to the video content, detecting a first time point in the video content that is currently being presented, identifying a first time point in the first augmentation media stream that corresponds to the first time point in the video content, and delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively.

As discussed above, as the number of services via which users may access media content, and particularly video content, increases and diversifies, service providers seeking to retain their customer bases are looking for ways to increase the engagement of their customers with their content. Moreover, different users may engage with video content in different ways. For instance, a first user who is hearing impaired may prefer to watch video content with closed captioning enabled, while a second viewer whose first language is different from the language of the video content's audio track may prefer to watch with subtitles in his first language. This may make it difficult for users with different viewing preferences to watch together in a manner that is universally engaging. For instance, for a group of users including the first user and the second user, the group might be forced to compromise on a single set of viewing preferences or to simply watch separately, on their own time, and abandon the shared viewing experience.

Examples of the present disclosure leverage the capabilities of augmented reality devices in order to augment a user's viewing experience when viewing video content. The use of the augmented reality devices allows different users, who may all be watching the same video content together at the same time, to augment their respective viewing experiences, independently of each other. In one example, one or more of the users may use an augmented reality device to present a respective augmentation media stream in a manner that is synchronized with a primary video content being viewed by all of the users. The augmentation media stream comprises a separate stream of content from the primary video content. Thus, when properly synchronized with the primary video content, the augmentation media stream allows the primary video content to be augmented or enhanced without being altered. This, in turn, allows each user to create a personalized viewing experience within a shared viewing event. For instance, the first user in the example above may use a head mounted display (HMD) to present an overlay of a closed captioning track, while the second user of the above example may use a set of earbuds to play an audio track comprising a dubbing of the primary video content's audio track in his first language. As such, multiple users may simultaneously experience the same primary video content, but augmented in different ways that are respectively personalized for the multiple users.

Although examples of the present disclosure are discussed within the context of visual (e.g., video) media, it will be appreciated that the examples described herein could apply equally to non-visual media, or to media that does not have a visual component. For instance, examples of the present disclosure could be used to augment a podcast, a streaming radio station, an audio book, or the like. Moreover, although the format of some media may be referred to herein as "streams," this does not necessarily imply that the media (e.g., primary video content or augmentation media stream) must be delivered in a streaming format (e.g., such that the playback device may play one portion of the media while other portions of the media are still being received or have yet to be received by the playback device). For instance, at least some of the media may reside in its entirety at the playback device prior to play. Within the context of the present disclosure, the term "stream" is simply used to differentiate between separate files containing different media.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in the augmentation of video content. For instance, in some examples, augmentation of video content may make use of the home network devices (e.g., immersive display 168, STB/DVR 162A, and/or Internet of Things devices (IoTs) 170), and may potentially also make use of any co-located mobile devices (e.g., mobile devices 167A and 167B), but may not make use of any mobile devices that are not co-located with the home network devices (e.g., mobile devices 157A and 157B).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an augmentation server 115 (e.g., an application server). For ease of illustration, various additional elements of core network 110 are omitted from FIG. 1.

In one example, augmentation server 115 may monitor a video content being presented on a user endpoint device, which may be one of the devices in the home network 160 (e.g., one or more of the mobile devices 157A, 157B, 167A, and 167B, the PC 166, the home phone 164, the TV 163, the immersive display 168, and/or the Internet of Things devices (IoTs) 170). The video content may not be delivered by the augmentation server 115, but rather by the TV servers 112, the content servers 113, the application servers 114, and/or the ad server 117. For instance, one of the user endpoint devices (e.g., the device presenting the video content or another device in the home network 160) may include a sensor that collects data from the device on which the video content is being presented. For instance, the data could be collected by one or more IoT devices (e.g., a virtual assistant device, a security system, etc.), by the user's mobile phone or wearable smart device (e.g., smart watch or fitness tracker), or the like. The data may include, e.g., images, audio signals, and/or other information about the video content. The data may also include direct user input received by the augmentation server 115 (e.g., a request to present a specific video content, to skip to a particular scene of the specific video content, etc). The data may be received by the augmentation server 115 in real time, e.g., as the sensors collect the data.

The augmentation server 115 may analyze the data in real time (e.g., as the data is received) in order to identify the specific video content being presented and/or a progress of the presentation of the specific video content. For instance, image processing on camera images of the device on which the video content is being presented (e.g., facial analysis of images of the actors' faces, text analysis of the title sequence and credits) could help the augmentation server 115 to identify the video content as a particular movie, a particular episode of the television show, or the like. Alternatively, the augmentation server 115 could perform content analysis on an audio signal of the device on which the video content is being presented (e.g., the recognition of a particular actor's or presenter's voice, the utterance of a particular line of dialogue, a theme song, or the like could help the augmentation server 115 to identify the video content as a particular movie, a particular episode of the television show, or the like).

Once the video content is identified, the augmentation server 115 may identify one or more augmentation media streams that are available to augment the user's experience of the video content. For instance, the augmentation media streams may comprise pre-recorded audio, video, haptic, and/or computer-generated content streams (or overlays) that are separate from the video content but that, when presented in a time-synchronized manner with the video content, may enhance the user's experience of the video content. As an example, an augmentation media stream may comprise a visual overlay of a closed captioning track to assist a user who may be hearing impaired or simply watching the video content on low volume. Another augmentation media stream may comprise an audio overlay of the video content's dialogue dubbed in an alternate language (e.g., a language other than the language in which the video content was originally filmed) to assist a user whose first language may be a language other than the language in which the video content was originally filmed). In one example, the augmentation server 115 may deliver a list of the available augmentation media streams for the video content to the user (e.g., via the device on which the video content is being presented, or another device, such as a device on which the augmentation media stream(s) may be played). In another example, the user may have pre-selected (e.g., in a user profile or in account or device settings) certain types of augmentation media streams as a default. For instance, the user's profile may specify that French closed caption augmentation media streams should always be displayed when available.

In response to the user selecting an augmentation media stream (e.g., either from a presented list or in a user profile), the augmentation server 115 may deliver the augmentation media stream to a user endpoint device on which the augmentation media stream may be presented. The video content and the augmentation media stream may be presented on separate devices in order to avoid altering the video content and to allow a group of users who may be experiencing the video content together to personalize their individual experiences of the video content without interfering with the others' experience of the video content. For instance, if the video content is a movie being presented on a television, a first user may use a head mounted display in order to view an augmentation media stream of a closed captioning track, while another user may use a set of earbuds to listen to an augmentation media stream of a movie critic's commentary.

In one example, each augmentation media stream delivered by the augmentation server 115 may include instructions that allow the augmentation media stream to be properly time-synchronized (and potentially spatially synchronized) with the video content. For instance, the augmentation server 115 may analyze data collected by the sensors (as described above) to monitor a progress of the presentation of the video content. For instance, based on the occurrence of a predefined marker in the video content (e.g., the appearance of a particular character in an image of the video content or the performance of a particular song or utterance of a particular line of dialogue in an audio signal of the video content), the augmentation server may be able to determine what part of the video content is currently being presented. In another example, no predefined markers may be defined, but the augmentation server 115 may be able to determine the part of the video content that is currently being presented in other ways. For instance, the augmentation server 115 may have access to one or more third-party data sources (e.g., server 149 in other network 140) which may contain images, scripts, and other data about the video content. The augmentation server 115 may be able to perform speech recognition on a line of dialogue, for instance, and then match the line of dialogue to a stored copy of the video content's script.

By monitoring the progress of the presentation of the video content, the augmentation server 115 may be able to identify the proper portion of the augmentation media stream to play at a given time. For instance, the augmentation server 115 may be able to provide an instruction that allows the device that is presenting the augmentation media stream to display a line of a closed captioning track at the same time that the line is being uttered in the video content. In one example, the augmentation server 115 does not monitor the progress of the video content only to initially time synchronize the augmentation media stream with the video content, but may monitor the progress of the video content continuously through the presentation of the video content in order to ensure that the video content and the augmentation media stream remain time-synchronized. For instance, the augmentation server 115 may provide instructions as necessary to pause presentation of the augmentation media stream when the presentation of the video content is paused or interrupted (e.g., due to manual pausing by the user, buffering delays, commercial breaks, or the like).

The augmentation server 115 may also, in some examples, monitor the user's movements and/or locations in order to ensure spatial synchronization of the video content and the augmentation media stream. For instance, the location on the display of an HMD at which a closed captioning track is displayed may be continuously adjusted responsive to changes in the user's field of view or viewing angle.

The various augmentation media streams that may be available for various items of video content may be stored at the augmentation server 115 or elsewhere in the network 100 (e.g., on content servers 113, application servers 114, server 149 in other network 140, and the like). For example, content providers may provide databases or repositories of augmentation media streams for their video content (e.g., as an on-demand service for subscribers). Alternatively, or in addition, third-party content providers may provide repositories of augmentation media streams for video content that is produced by other parties. For instance, augmentation media streams may be provided as a standalone third-party service. In yet another example, user-generated (e.g., amateur) augmentation media streams may be available from various sources throughout the network 100.

Figure 3:
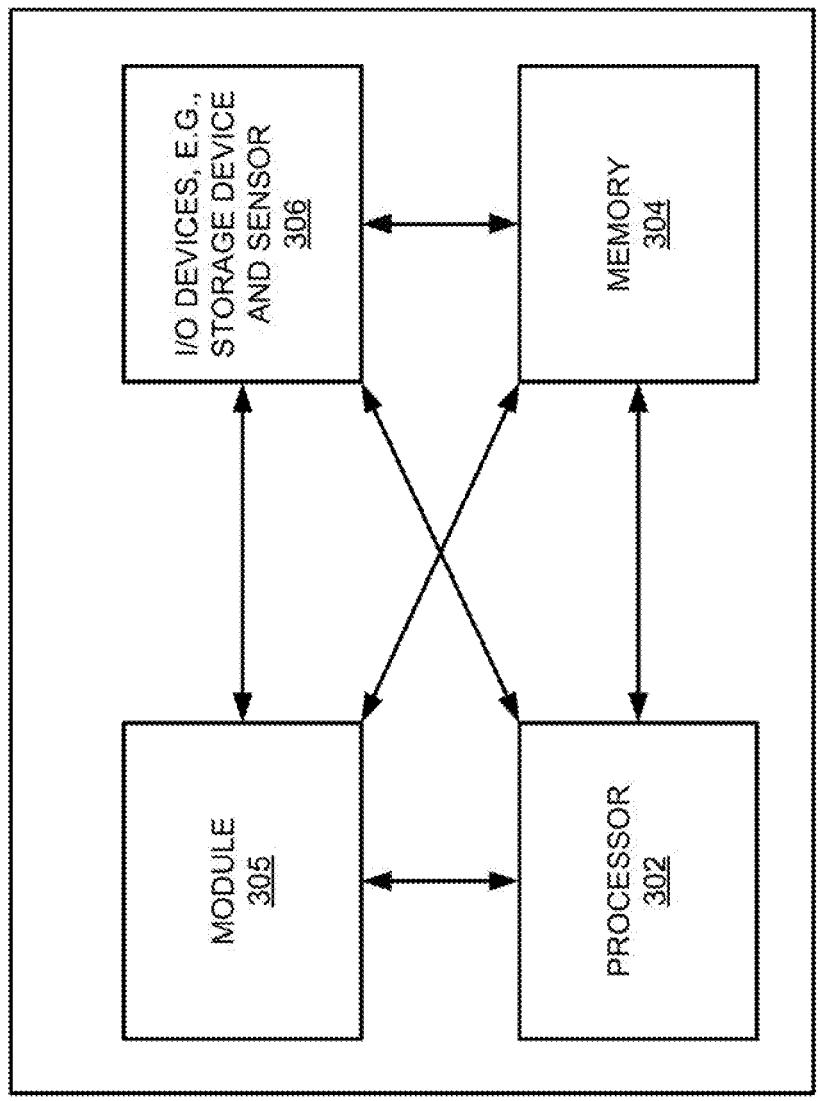
FIG. 3 illustrates an example of a computing device, or computing system, specifically programmed to perform the steps, functions, blocks, and/or operations described herein.

In one example, any or all of the television servers 112, content servers 113, application servers 114, augmentation server 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a 3rd party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, IoTs 170 and so forth.

In one example, router 165 may further communicate with TV (broadly a display) 163 and/or immersive display 168, e.g., where one or both of the television and the immersive display incorporates "smart" features. The immersive display may comprise a display with a wide field of view (e.g., in one example, at least ninety to one hundred degrees). For instance, head mounted displays, simulators, visualization systems, cave automatic virtual environment (CAVE) systems, stereoscopic three dimensional displays, and the like are all examples of immersive displays that may be used in conjunction with examples of the present disclosure. In other examples, an "immersive display" may also be realized as an augmentation of existing vision augmenting devices, such as glasses, monocles, contact lenses, or devices that deliver visual content directly to a user's retina (e.g., via mini-lasers or optically diffracted light). In further examples, an "immersive display" may include visual patterns projected on surfaces such as windows, doors, floors, or ceilings made of transparent materials.

In another example, the router 165 may further communicate with one or more IoTs 170, e.g., a connected security system, an automated assistant device or interface, a connected thermostat, a connected speaker system, or the like. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
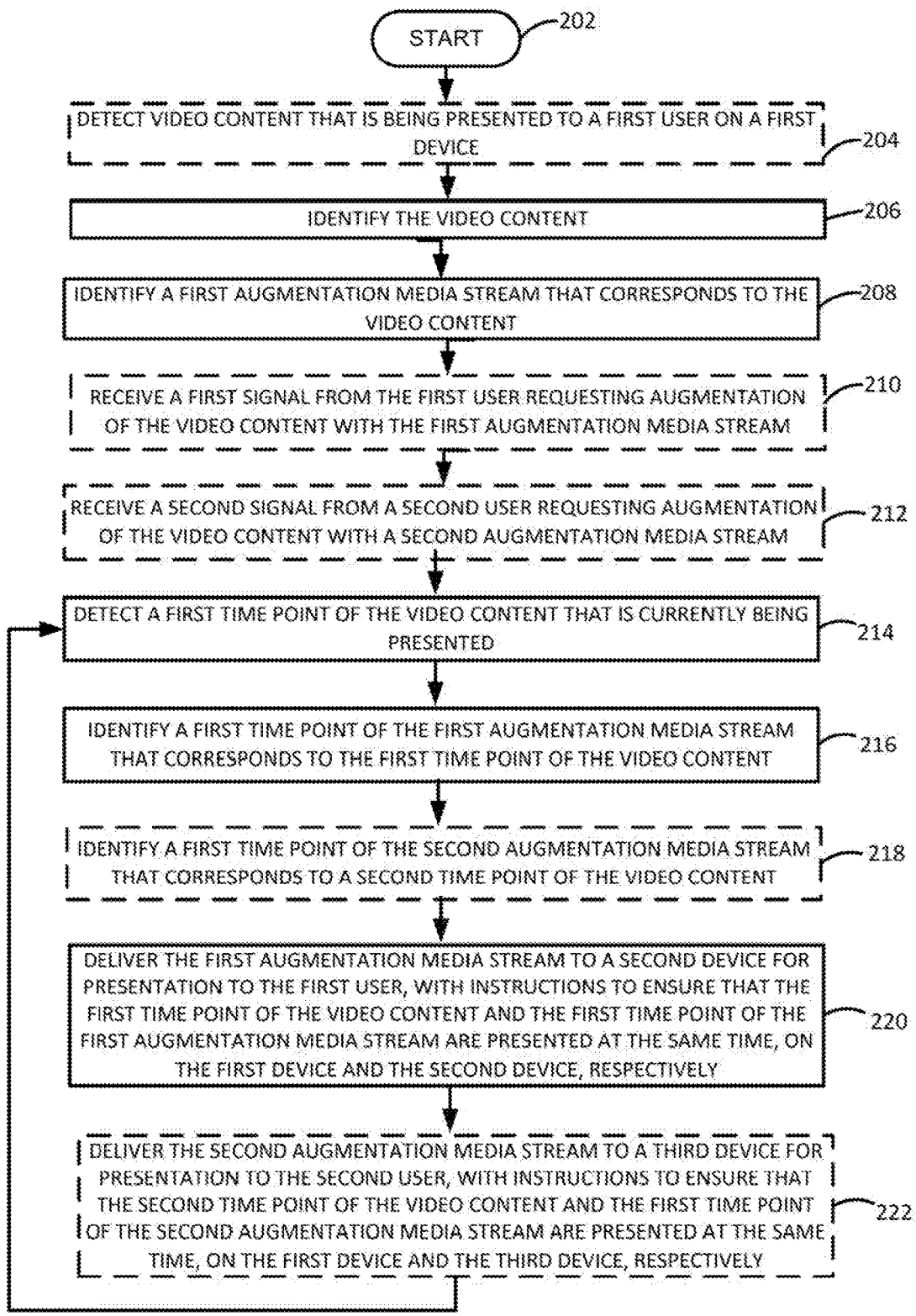
FIG. 2 illustrates a flowchart of an example method for augmenting video content, in accordance with the present disclosure.

FIG. 2 illustrates a flowchart of an example method 200 for augmenting video content, in accordance with the present disclosure. In one example, steps, functions and/or operations of the method 200 may be performed by a device as illustrated in FIG. 1, e.g., augmentation server 115, a user endpoint device (e.g., mobile devices 157A, 157B, 167A and 167B, STBs 162A and 162B, TV 163, PC 166, immersive display 168), or any one or more components thereof. In one example, the steps, functions, or operations of method 200 may be performed by a computing device or system 300, and/or a processing system 302 as described in connection with FIG. 3 below. For instance, the computing device 300 may represent at least a portion of the augmentation server 115 or a user endpoint device in accordance with the present disclosure. For illustrative purposes, the method 200 is described in greater detail below in connection with an example performed by a processing system, such as processing system 302.

The method 200 begins in step 202 and proceeds to step 204. In optional step 204 (illustrated in phantom), the processing system may detect video content that is being presented to a first user on a first device (e.g., may detect that the first user is watching video content). In one example, the processing system may be separate from the first device. For instance, the first device may be a smart television, while the processing system may be part of an HMD, a set of earbuds, a mobile phone, or another endpoint device. Alternatively, the processing system may be part of a remote server that is in communication with the first device and at least a second device (e.g., an HMD, a set of earbuds, a mobile phone, or another endpoint device in proximity to the first device) via a network (e.g., a radio access network). The video content may be presented on the first device via a streaming service, a broadcast or satellite television channel, a digital video disk (DVD), a video download, or a video on demand feature. Examples of the present disclosure work to augment the presentation of the video content regardless of the source of the video content.

In one example, the processing system may detect the video content using one or more sensors that are in proximity to the first device. For instance, if the first device is a smart television, one or more computing devices, IoT devices, or other user endpoint devices may be located in proximity to the smart television and may include sensors that are capable of collecting data that is indicative of the video content being presented on the first device. For instance, an HMD may include a camera that may be capable of capturing images of the smart television, a virtual assistant device may include a speaker that is capable of capturing audio emitted by the smart television, or a service accessed via the smart television may record a selection of the video content by the user in the user's viewing history.

In step 206, the processing system may identify the video content. In one example, identification of the video content may be based on data gathered during the detection of step 204 (e.g., data gathered by one or more sensors). For instance, the processing system may perform image analysis on one or more images (e.g., video frames) of the video content being presented on the first device. The image analysis may include facial recognition, object recognition, text recognition, or other techniques that can be used to recognize elements such as people (e.g., characters, presenters, etc.), places (e.g., landmarks, distinctive settings, etc.), things (e.g., vehicles, costumes, etc.), and words (e.g., actor names, movie titles, etc.) that are seen in the video content. The processing system may similarly perform audio analysis on one or more audio samples of the video content being presented on the first device. The audio analysis may include voice recognition, speech-to-text transcription, sound recognition, or other techniques that can be used to recognize elements such as people, places, things, and words that are heard in the video content.

Recognized elements (e.g., people, places, things, and words) may then be used to search an index of known items of video content for a match. For instance, a recognized image of a distinctive vehicle (e.g., the Batmobile, the Millennium Falcon, etc.) may be used to identify known video content in which the distinctive vehicle appears. A recognized line of dialogue (e.g., "I know it was you, Fredo") or a recognized song (e.g., "Let It Go") may be used to identify known video content containing the line of dialogue or the song. In one example, the index of known items may include items for which augmentation media streams are known to be available. For instance, a service provider may maintain a database of augmentation media streams which are indexed according to the video content that the augmentation media streams are meant to augment. Thus, the search space for the identifying in step 206 may be as large as the contents of the database.

In another example, however, augmentation media streams may be stored across more than one location and/or source. For instance, in some examples, augmentation media streams could be crowd-sourced. For instance, users may create their own augmentation media streams for different video content and may upload those augmentation media streams to different searchable locations.

In step 208, the processing system may identify a first augmentation media stream that corresponds to the video content. For instance, once the processing system has identified the video content, the processing system may be able to determine whether any augmentation media streams exist for the video content. In one example, as discussed above, a service provider may maintain a database of augmentation media streams which are indexed according to the video content the augmentation media streams are meant to augment. Any video content for which an entry exists in the database may be associated with one or more augmentation media streams. For instance, if the video content is a movie, the movie may be associated with a plurality of different augmentation media streams including the first augmentation media stream. The first augmentation media stream for the movie may comprise a closed captioning track that is presented as a visual overlay. A second augmentation media stream for the movie may comprise a dub of the movie in an alternate language (i.e., a language other than the language in which the movie was originally filmed) that is presented as an audio overlay. A third augmentation media stream for the movie may comprise a director's or actor's commentary track that is presented as an audio overlay.

In optional step 210 (illustrated in phantom), the processing system may receive a first signal from the first user requesting augmentation of the video content with the first augmentation media stream. For instance, the first user may signal (e.g., by pressing a button on a remote control, touching the screen of a mobile phone or computing device, giving a verbal command to a virtual assistant device, etc.) a selection of the first augmentation media stream from among one or more possible augmentation media streams for the video content. Thus, the first signal may be received in response to the processing system presenting a menu to the first user, where the menu indicates the one or more possible augmentation media streams that are available for the video content. In some examples, the first user may request more than one augmentation media stream for presentation. For instance, the first user may request both a visual closed captioning augmentation media stream and an audible augmentation media stream that provides director's commentary. Step 210 may be considered optional in cases where the first user may have pre-selected certain types of augmentation media streams in a user profile or in device or account settings, as described above.

In one example, the first signal may include an identification of a second device, separate from the first device, to which the augmentation media stream is to be delivered. For instance, the first signal may indicate that the first user has selected a closed captioning track that is presented as a visual overlay (e.g., to augment a visual component of the video content), and that the closed captioning track should be delivered to an HMD having a specific identifier (e.g., an HMD that is paired, via a short-range wireless communication protocol, with the first device or with another device).

In optional step 212 (illustrated in phantom), the processing system may receive a second signal from a second user requesting augmentation of the video content with a second augmentation media stream. The second augmentation media stream may be another augmentation media stream of multiple augmentation media streams associated with the video content. For instance, if the first augmentation media stream is a closed captioning track that is presented as a visual overlay, the second augmentation media stream may be an audio overlay of the dialogue dubbed into an alternate language (e.g., to augment an audio component of the video content). The second signal may be conveyed in a manner similar to the first signal. However, the second signal may indicate that the second augmentation media stream should be delivered to a third device, separate from the first and second devices. For instance, the third device may be a set of earbuds belonging to the second user. Thus, the first user and the second user may choose to augment the video content in different manners (e.g., augmenting with different content and/or via different modalities).

In step 214, the processing system may detect a first time point of the video content that is currently being presented. For instance, once the video content is identified in step 206, the processing system may be able to monitor the progress of the presentation of the video content by continuing to analyze sensor data from one or more devices in proximity to the first device. For instance, the processing system may know (e.g., based on metadata associated with the video content or on other available data associated with the video content) that a specific event in the video content happens at a specific time. As an example, the title of a movie may be known to be displayed for a duration of x seconds, or that y seconds elapses between the beginning of a song that opens the movie and the movie's first line of dialogue. The first time point may be the time point that is currently being presented, or may be a time point that is known to occur a predefined amount of time after the time point that is currently being presented.

In step 216, the processing system may identify a first time point of the first augmentation media stream that corresponds to the first time point of the video content. For instance, metadata associated with the first augmentation media stream may identify both a specific time point (e.g., timestamp, frame number, or the like) in the first augmentation media stream and a corresponding marker (e.g., an event having a known duration or timing relative to some other event) in the video content. As an example, the specific time point in the first augmentation media stream may be a time point at which display of a closed captioning track begins, while the corresponding marker in the video content may be a time point at which the video content's first line of dialogue is uttered.

In optional step 218 (illustrated in phantom), the processing system may identify a first time point of the second augmentation media stream that corresponds to a second time point of the video content. The second time point of the video content may or may not be the same as the first time point of the video content discussed above with reference to step 216. The specific time point in the second augmentation media stream may be a time point at which a first line of dialogue is uttered in an alternate language, while the corresponding marker in the video content may be the time point at which the video content's first line of dialogue is uttered.

In step 220, the processing system may deliver the first augmentation media stream to a second device for presentation to the first user, wherein delivering includes providing instructions for time-synchronizing the first augmentation media stream with the video content so that the first time point of the video content and the first time point of the first augmentation media stream are presented to the first user at the same time, on the first device and the second device, respectively. Step 220 may include monitoring the presentation of the video content in order to properly time presentation of the first augmentation media stream. For instance, the processing system may wait for a certain marker in the presentation of the video content (e.g., utterance of a specific line of dialogue, display of a title or an actor's name, display of a studio trademark, etc.) to be presented before providing instructions for presentation of the first augmentation media stream. In some cases, the instructions may include instructions to skip ahead or rewind to a specific point in the first augmentation media stream in order to time-synchronize the first augmentation media stream with the video content. For instance, if presentation of the video content was already in progress (e.g., in the middle of a movie) before the first signal to present the first augmentation media stream was received, the processing system may need to identify a closest marker in the video content (e.g., the next soonest marker to occur, or an immediate previous marker), and then instruct the second device to skip ahead (or rewind back) in the first augmentation media stream to find the first time point in the first augmentation media stream that corresponds to the marker.

In some examples, time-synchronizing of the first augmentation media stream with the video content may include accounting for pauses, rewinds, fast forwards, and other events in the presentation of the video content that may disrupt the linearity of the presentation of the video content. For instance, if the processing system detects a pause in the presentation of the video content, the processing system may also instruct the second device to pause presentation of the first augmentation media stream until the presentation of the video content is un-paused. The pausing could be due to the first user actively pausing the presentation (e.g., so that he or she can get up to get a snack, answer the phone, etc.) due to buffering of the video content if the video content is being streamed over a network, due to interruption of the video content for commercials or breaking news, or due to other factors. Thus, pausing the first augmentation media stream may help to ensure that the first augmentation media stream does not get ahead of the video content and disrupt the synchronization. Similarly, if the presentation of the video content fast forwards through a scene, the processing system may monitor presentation of the video content for a new marker and then instruct the second device to skip ahead in the first augmentation media stream to the time point in the first augmentation media stream that is associated with the new marker.

In optional step 222 (illustrated in phantom), the processing system may deliver the second augmentation media stream to a third device for presentation to the second user, wherein the delivering includes providing instructions to time-synchronize the second augmentation media stream with the video content so that the second time point of the video content and the first time point of the second augmentation media stream are presented to the second user at the same time, on the first device and the third device, respectively. Time-synchronization of the video content and the second augmentation media stream may be performed in a similar manner to time-synchronization of the video content and the first augmentation media stream, discussed above in connection with step 220.

The method 200 may return to step 216 and may continue to monitor the presentation of the video content in order to ensure that the first augmentation media stream (and, optionally, the second augmentation media stream) continues to be properly time-synchronized to the video content. Thus, steps 216-222 may be repeated continuously, at least until a signal is received from the first user (or the second user) to stop presenting the first augmentation media stream (or the second augmentation media stream).

In one example, steps 220 and/or 222 may further comprise providing instructions for spatially synchronizing the respective augmentation media streams with the video content. For instance, where an augmentation media stream comprises a visual overlay, such as a closed captioning track, the augmentation media stream may be presented on a mobile or movable display device, such as an HMD. Thus, the field of view of a user who is wearing the HMB may change as the user moves his or her head. In this case, the processing system may monitor the user's movements in real time (e.g., via data collected by a gyroscope, accelerometer, or other sensors in the HMD or via a sensor that is external to the HMD, such as a sensor in a proximally located IoT device) in order to track the user's field of view and/or viewing angle. Responsive to a change in the user's field of view, the processing system may provide instructions to the HMD to adjust a position at which the visual overlay is displayed on the display of the HMD (e.g., using head position telemetry).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Moreover, although examples of the method 200 are described within the context of a first device (e.g., an augmentation server) identifying the video content and the corresponding augmentation media stream and a second device (e.g., an HMD) displaying the augmentation media stream, it will be appreciated that a single device may, in some examples, perform all of these operations. For instance, a user endpoint device that is presenting video and/or audio streams (such as a smart television, a set top box, or a mobile device) could monitor the video and/or audio streams and also synchronize and display the augmentation media stream. Having a single device perform all of these operations may be preferable in a single-viewer environment or an environment in which all viewers agree on the same augmentation to the video content. Use of a second device to display an augmentation media stream, as described above, may be preferable in a multi-viewer environment in which different viewers may need or prefer different augmentations to the video content.

Additionally, although examples of augmentation media streams described herein refer primarily to visual and/or audible augmentation media streams, it will be appreciated that augmentation media streams may be available for other types of sensory augmentations as well. For instance, depending on device capabilities, augmentation media streams may provide overlays of olfactory augmentations (e.g., generating a specific smell), tactile augmentations (e.g., potentially provided through a haptic feedback device), temperature augmentations (e.g., blowing hot or cool air on a user), and/or gustatory augmentations (e.g., generating a specific taste).

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for augmenting video content, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner fora particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for augmenting video content (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for augmenting video content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
identifying, by a processing system including at least one processor, a video content being presented to a first user on a first device;
identifying, by the processing system, a first augmentation media stream that corresponds to the video content;
detecting, by the processing system, a first time point in the video content that is currently being presented;
identifying, by the processing system, a first time point in the first augmentation media stream that corresponds to the first time point in the video content;
delivering, by the processing system, the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively, wherein the delivering comprises continuously monitoring a progress of a presentation of the video content in order to ensure continuing time-synchronization of the first augmentation media stream with the video content.

2. The method of claim 1, further comprising:
identifying, by the processing system, a second augmentation media stream that corresponds to the video content;
detecting, by the processing system, a second time point in the video content that is currently being presented;
identifying, by the processing system, a first time point in the second augmentation media stream that corresponds to the second time point in the video content; and
delivering, by the processing system, the second augmentation media stream to a third device, wherein the delivering comprises providing instructions for time-synchronizing the second augmentation media stream with the video content so that the second time point of the video content and the first time point of the second augmentation media stream are presented to a second user at a same time, on the first device and the third device, respectively.

3. The method of claim 1, wherein the identifying the video content comprises:
recognizing, by the processing system, an element of the video content; and
utilizing, by the processing system, the element to search an index of known items of video content for a match.

4. The method of claim 3, wherein the recognizing comprises:
performing, by the processing system, an image analysis technique on an image of the video content being presented on the first device, wherein the image is provided by a sensor positioned in proximity to the first device.

5. The method of claim 3, wherein the recognizing comprises:
performing, by the processing system, an audio analysis technique on an audio sample of the video content being presented on the first device, wherein the audio sample is provided by a sensor positioned in proximity to the first device.

6. The method of claim 1, wherein the first augmentation media stream comprises a visual overlay that augments a visual component of the video content.

7. The method of claim 1, wherein the first augmentation media stream comprises an audio overlay that augments an audio component of the video content.

8. The method of claim 1, wherein the detecting comprises:
detecting, by the processing system, an occurrence of a marker in a presentation of the video content.

9. The method of claim 8, wherein the marker comprises an event having a known duration.

10. The method of claim 8, wherein the marker comprises a first event having a known timing relative to a second event.

11. The method of claim 1, wherein the first time point in the first augmentation media stream is identified by at least one of: a time stamp in the first augmentation media stream or a frame number of the first augmentation media stream.

12. The method of claim 1, wherein the continuously monitoring comprises:
detecting, by the processing system, a pause in the presentation of the video content; and
instructing, by the processing system, the second device to pause a presentation of the first augmentation media stream at least until the pause in the presentation of the video content ends.

13. The method of claim 1, wherein the second device is at least one of: a head mounted display or a set of earbuds.

14. The method of claim 1, further comprising, prior to the detecting the first time point in the video content:
receiving, by the processing system, a signal from the first user requesting augmentation of the video content with the first augmentation media stream.

15. The method of claim 1, wherein the first augmentation media stream comprises an overlay that augments at least one of: an olfactory component of the video content, a gustatory component of the video content, a tactile component of the video content, of a temperature component of the video content.

16. The method of claim 1, wherein the delivering further comprises providing instructions for spatially synchronizing the first augmentation media stream with the video content, when the first augmentation media stream comprises a visual overlay.

17. The method of claim 16, wherein further comprising:
monitoring, by the processing system, a field of view of the first user; and
responsive to a change in the field of view of the first user, including, by the processing system, instructions to adjust a position at which the visual overlay is displayed on a display of the second device.

18. A non-transitory computer-readable medium storing instructions which, when executed by a processing system including at least one processor, cause the processing system to perform operations, the operations comprising:
identifying a video content being presented to a first user on a first device;
identifying a first augmentation media stream that corresponds to the video content;
detecting a first time point in the video content that is currently being presented;
identifying a first time point in the first augmentation media stream that corresponds to the first time point in the video content; and
delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively, wherein the delivering comprises continuously monitoring a progress of a presentation of the video content in order to ensure continuing time-synchronization of the first augmentation media stream with the video content.

19. The non-transitory computer-readable medium of claim 18, wherein the continuously monitoring comprises:
detecting a pause in the presentation of the video content; and
instructing the second device to pause a presentation of the first augmentation media stream at least until the pause in the presentation of the video content ends.

20. A device comprising:
a processing system including at least one processor; and
a non-transitory computer-readable medium storing instructions which, when executed by the processing system, cause the processing system to perform operations, the operations comprising:
identifying a video content being presented to a first user on a first device;
identifying a first augmentation media stream that corresponds to the video content;
detecting a first time point in the video content that is currently being presented;
identifying a first time point in the first augmentation media stream that corresponds to the first time point in the video content; and
delivering the first augmentation media stream to a second device, wherein the delivering comprises providing instructions for time-synchronizing the first augmentation media stream with the video content so that the first time point of the video content and the first time point of the first augmentation media stream are presented to the first user at a same time, on the first device and the second device, respectively, wherein the delivering comprises continuously monitoring a progress of a presentation of the video content in order to ensure continuing time-synchronization of the first augmentation media stream with the video content.

* * * * *